United States Patent [19]
Cohn et al.

[11] Patent Number: 5,493,724
[45] Date of Patent: Feb. 20, 1996

[54] LOCKING A NON-BUSY DEVICE FOR ACCESSING A DATA RECORD STORED ON ANOTHER DEVICE

[75] Inventors: Oded Cohn, Haifa, Israel; William F. Micka, Tucson, Ariz.; Kenneth M. Nagin, Haifa, Israel; Yoram Novick, Haifa, Israel; Udi N. Rotics, Haifa, Israel; Alexander Winokur, Haifa, Israel; Efraim Zeidner, Kiryat Chaim, Israel

[73] Assignee: International Business Machines Corporation, Armonk, N.Y.

[21] Appl. No.: 41,376

[22] Filed: Apr. 1, 1993

[51] Int. Cl.$^6$ .................... G06F 13/14; G06F 12/02
[52] U.S. Cl. .................... 395/858; 395/857; 395/479; 395/445; 395/438; 364/DIG. 1; 364/DIG. 2
[58] Field of Search .................... 395/275, 325, 395/400, 425, 600, 650, 725, 575, 857, 479, 445, 438, 858; 380/4; 364/DIG. 1, DIG. 2, 200

[56] References Cited

U.S. PATENT DOCUMENTS

| | | | |
|---|---|---|---|
| 4,430,701 | 2/1984 | Christian et al. | 395/446 |
| 4,493,028 | 1/1985 | Heath | 395/821 |
| 4,819,159 | 4/1989 | Shipley et al. | 395/182.17 |
| 4,939,644 | 7/1990 | Harrington et al. | 395/825 |
| 5,161,227 | 11/1992 | Dias et al. | 395/650 |
| 5,218,695 | 6/1993 | Noveck et al. | 395/600 |
| 5,261,069 | 11/1993 | Wilkinson et al. | 395/472 |
| 5,287,459 | 2/1994 | Gniewek | 395/438 |
| 5,297,262 | 3/1994 | Cox et al. | 395/311 |
| 5,325,523 | 6/1994 | Beglin et al. | 395/600 |
| 5,341,491 | 8/1994 | Ramanujan | 395/479 |

OTHER PUBLICATIONS

IBM TDB, Improving Airline Subsystem Performance By Overlapping Semi–Synchronous Process, pp. 345–347, N Oct. 1991.

Enterprise Systems Architecture/390 "System/360 and System/370 I/O Interface Channel To Control Unit—Original Equipment Manufacturers' Information", IBM GA22–6974–10. Sep. 1992.

*Primary Examiner*—Tod R. Swann
*Assistant Examiner*—James Peikari
*Attorney, Agent, or Firm*—F. E. Anderson

[57] ABSTRACT

A method and apparatus for improving storage controller throughput when servicing non-specific read requests. Throughput is increased by enabling the storage controller to service non-specific read requests issued against a device address which is not the same as the device address associated with the data that the non-specific read is requesting. The device address associated with the data is thus free to be used for another I/O operation. When the device address used by the non-specific read is a non-busy type (that is, the device and/or data is not locked) then the throughput improvement is obtained by increasing the number of data requests that may be concurrently handled by the storage controller.

15 Claims, 4 Drawing Sheets

LOCKING A NON-BUSY DEVICE FOR ACCESSING A DATA RECORD STORED ON ANOTHER DEVICE

BACKGROUND OF THE INVENTION

1. Field of the Invention

The present invention relates in general to data management within computer storage subsystems and in particular to an improved method and system for improving data throughput in a storage controller of a computer storage subsystem.

2. Description of the Related Art

Data processing systems frequently include large scale storage devices, such as Direct Access Storage Devices (DASD) which are located externally to a host computer system and sometimes at significant distances from the host computer system. A storage controller is often installed between host processors and the DASD devices themselves. The controller acts not only as a path director for data flowing between the host and the DASDs but also as a performance enhancer for the data processing system as a whole. This second activity is accomplished through the use of cached memory within the storage controller.

The IBM 3990 Model 3 is an example of a storage controller having a cache function. This controller can attach to 370, 370-XA, ESA/370 and ESCON channels which are all well known in the art. When the controller is operating with 370 channels, it project path-independent device allocation. When, on the other hand, the 3990 is operating with 370-XA, ESA/370 channels, it provides both path-independent device allocation and dynamic path reconnection.

Communication between the host system and the storage controller is typically accomplished over data channels which are well known in the art. An example of such a data channel is the IBM Corporation's ESCON channel architecture.

The data channels allow communication between the host processor and the storage controller using a set of commands which direct the controller to process specific data at specific locations. For example, in the IBM System/360 and System/370 host environments, the CPU issues a series of commands identified in 360/370 architecture as Channel Command Words (CCWs) which control the operation of the associated DASD through the storage controller.

A common architecture used within storage subsystems is known as "Count-Key-Data" (CKD). With this architecture, records written on a track within a DASD unit are provided with a count field (an identification), an optional key field and a data field. A record on DASD may occupy one or more units of real storage. A dataset is a logical collection of multiple records which may be stored on contiguous units of real storage or which may be dispersed. Data is then stored and/or retrieved from a DASD using write and read requests which are issued by the host system.

Another channel program protocol, known as Extended Count Key Data (ECKD) was introduced to facilitate subsystem operation in an asynchronous manner. ECKD provides also an extended command set from that of CKD. It includes all of the CKD commands, with enhanced versions of specific commands.

A data transfer operation is initiated by the host CPU generating a START I/O instruction which is passed to the channel and causes control to be relinquished to a chain of CCWs. The CCW chain is then sent over the channel to the storage controller so that control operations can be effected and the proper storage device can be selected to activate data transfer.

Each CCW is separately resident in the CPU main store and must be fetched by the channel program, decoded and transferred to the storage controller. The CCW specifies the command to be executed and the storage area, if any, to be used.

The mechanism which enables host systems to retrieve data which has previously been stored on a disk is the "data disk address". Therefore, when issuing a read request, the host system specifies where on the DASD storage subsystem the data should be placed. Later, if the host system wishes to retrieve this data it will issue a read request utilizing the same address.

Data stored on a disk within a storage subsystem is always associated with a unique data descriptor which identifies that data. In a read request the host specifies the data descriptor of the data it wishes to receive. In response to such a request the DASD subsystem will send the referenced data back to the host. For purposes of the explanation herein, such read requests which utilize data descriptors are referred to as "specific read requests".

Over the past few years, cache, or high density electronic storage has been introduced into DASD storage subsystems. Access time between the cache and the channel is much faster than that between DASD and the channel. There are various physical device movements and other operations associated with DASD which limit data transmission speed. One such limitation is the time required for the magnetic disk to rotate until it is aligned with the transducer contained in the read head. Another is the limited bandwidth associated with the magnetic transducers used to read and write data.

These limitations are not present with a cache access. Through the use of various caching algorithms, frequently used data is maintained in cache storage rather than being read directly from DASD and, as a result, can be supplied to the channel at the speed associated with electronic storage rather than that of magnetic storage.

For read operations data can be transferred between the cache and channel at channel speeds which can often be as high as 18 MB per second, depending upon the host processor, cache and channel configurations. In addition, it is also possible to accept and process write operations originating from the channel at greatly improved speeds through the use of cache.

In the ECKD architecture, the host refers to data stored on disk devices by data address. This address is composed of a unique device address and the location of the data on the device. When a host issues a data request, read or write, it must select a device address first. This selection serves two different purposes. First, it is the mechanism by which the host informs the storage controller of the device portion of the data address. Secondly, it reserves the device for the request, blocking the execution of other requests against this device. This is done to prohibit attempts of multiple concurrent accesses to the physical disk device since the mechanics of the disk do not allow concurrent accesses to the media.

The host processor maintains a Unit Control Block (UCB) lock for every DASD. When an I/O access is requested, the host first locks the UCB entry associated with the device and then issues the request to the storage controller. During the period that the I/O request is being serviced, the UCB entry remains locked. If another request is made for data on the same device the request will be rejected or queued until the UCB entry is freed.

The storage controller similarly maintains a UCB lock for every device. The storage controller UCB insures serialization between multiple hosts, in the case where multiple hosts are connected to the storage controller. This UCB prevents multiple accesses to the same DASD by more than one host processor. When a device is selected in connection with a host data request, its UCB is reserved. Any other request attempting to select this device is rejected until the original request ends.

It is important to realize that in addition to allowing faster access to data, cache memory provides another key feature. As opposed to DASD units, cache permits multiple concurrent access to its data. In the absence of the invention described herein and as a result of the prior art data selection process, two data requests are still prohibited from concurrent execution if they refer to data on the same device even when the relevant data image is in the cache. This is because specific read requests, as described above, specify a disk address irregardless of whether the data is in cache since the host is unaware of the true location of the requested data. Furthermore, two data requests specifying the same disk address are prevented from executing concurrently due to the limitations of the DASD devices.

When cache is present in a storage subsystem it is necessary to have two locks in addition to those described above. The first is a physical device lock. There is one such lock per DASD device and it is held when an access to the physical device is in progress. The lock may be held due to a host data request or a storage controller internal resource management operation. This lock, instead of the UCB lock in a non-cache environment, arbitrates attempts to gain multiple concurrent access to a particular physical device.

A second lock, termed a data lock, is also necessary in a cached subsystem. There is one such lock per "data item" contained within the cache memory and the lock is reserved when accessing the "data item" in the cache. Although the size of a "data item"0 can vary, for exemplary purposes it is noted that in the IBM 3990 Model 3, a "data item" corresponds to one track of data. Since cache, as described above, allows for multiple concurrent accesses to data, these locks are necessary to prevent multiple concurrent accesses to a specific item of data in the cache.

Those skilled in the art will appreciate that, in addition to providing cache access, it would be advantageous to permit a host system to retrieve data from a DASD subsystem on a basis other than a data descriptor. For example, in cases where the host system requests a large amount of data occupying many disk tracks the efficiency of transferring that data to the host might be enhanced if the order of data access and transfer is modified in order to minimize both seek time and latency time within the data storage subsystem.

This is generally not possible since host systems do not know the head location within the DASD subsystem and thus are not able to issue specific read requests which would minimize the disk seek and latency time. A method for permitting this type of data transfer using "non-specific reads" is described in a copending commonly-assigned patent application Ser. No. 07/949,673 filed on Sep. 23, 1992, now U.S. Pat. No. 5,408,656, and titled "Method and System for Non-Specific Data Retrieval in a Data Processing System".

Non-Specific Data retrieval, as described in the above referenced patent application, is a method for increasing the efficiency of data retrieval from multiple Direct Access Storage Devices by permitting the host system to retrieve data utilizing a non-specific read request. In other words, data may be requested by the host by specifying a non-address attribute. For example, in a case where large amounts of data need to be transferred and the order of transfer is not important, the storage subsystem can retrieve data which is physically closest to the head within the DASD device.

This is accomplished by specifying boundary addresses between which all data present is to be retrieved by the storage controller and transmitted to the host system. Thus, all data records between the boundary addresses are retrieved without specifying exact address data for each desired dataset. In addition to boundary addresses, data may be retrieved "non-specifically" by specifying as the non-address attribute those datasets which have been updated subsequent to a specified event.

Even with the advent of cache memory within storage controllers and the methodology of non-specific reads, control unit throughput can be less than desirable. Currently, many disk device I/O protocols are implemented such that the number of I/O requests that may occur concurrently is limited by the number of physical devices that exist in a computer storage subsystem. This is because the majority of protocols, including IBM ECKD, associate each I/O operation with a device address. Furthermore, most storage controllers, including the IBM Model 3990, will only accept I/O operations directed toward a physical device to which it is attached and then only one operation per physical device at a time.

Given the above storage controller implementation limitations, the maximum number of concurrent I/O requests (which is equal to the number of physical DASD) can not be overcome. In a typical data processing environment, however, all of the devices in the storage subsystem are rarely, if ever, accessed at the same time. Often specific DASD units are much more busy than other DASD units within the same storage subsystem. In fact, there are many devices that remain continuously idle and are only used as back up units for the situation when another device fails.

Thus, it can be seen that it would be very desirable to provide a method and system which can improve storage controller throughput by utilizing the addresses of non-busy spare devices to allow for concurrent data transfers between a host processor and a group of DASD devices through the storage controller.

SUMMARY OF THE INVENTION

It is therefore an object of the invention to provide a method for efficiently managing a data storage subsystem in a data processing system.

It is another object of the invention to increase the operating speed of the subsystem.

It is yet another object of the invention to allow for concurrent data transfers between a host processor and a group of DASD devices through the storage controller.

In a preferred embodiment of the present invention, a data processing system is provided having a host processor with a storage controller attached thereto. A plurality of data storage devices are coupled to the storage controller, wherein the host system maintains a host unit control block for each data storage device. Additionally, the storage controller maintains a controller unit control block for each data storage device. Non-specific read requests from the hsot system are serviced for a data record by generating the non-specific read request at the host system resides on a first data storage device having a first host control block corresponding therewith. A second host control block is selected wherein the second host unit control block corresponds to a second data storage device, the second data storage device being different than the first device. The second host unit control block is then locked, and the non-specific read request is then transmitted to the storage controller, the non-specific read request including the second host unit control block.

BRIEF DESCRIPTION OF THE DRAWINGS

The above and further objects, features and advantages of the present invention will become more apparent from the following detailed description taken in conjunction with the accompanying drawings, wherein.

DETAILED DESCRIPTION OF THE INVENTION

Figure 1:
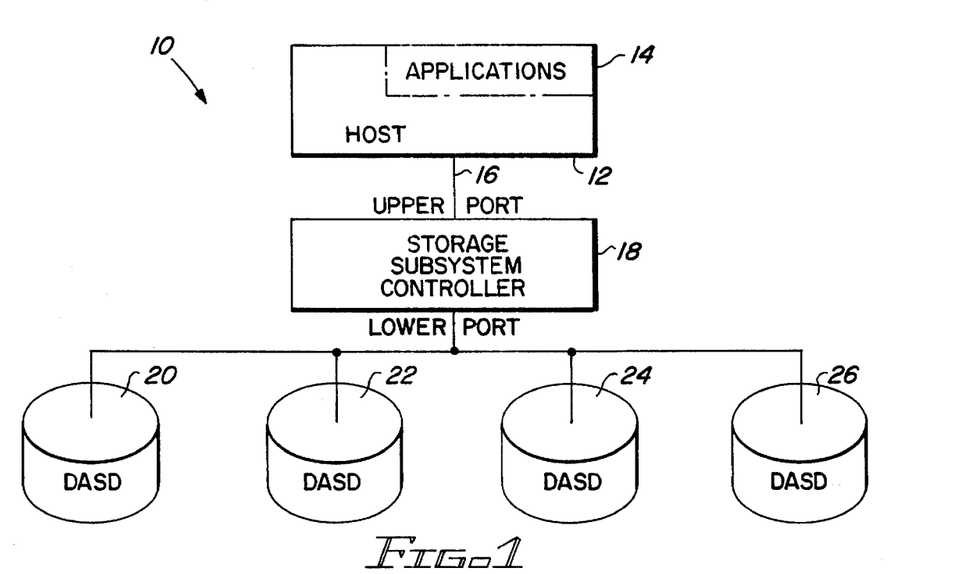
FIG. 1 is a pictorial representation of a data processing system which may be used to implement the method and apparatus of the present invention.

Referring now to FIG. 1, a data processing system 10 in which the present invention is embodied will be described.

Data processing system 10 includes a storage controller 18, a host processor 12 and a plurality of direct access storage devices (DASD's) 20, 22, 24 and 26. Although only one host processor is pictured, it should be recognized that additional host processors can be connected to a single storage controller in order to share DASD devices. DASDs are generally magnetic storage units such as disk drives. In this embodiment, the DASDs 20–26 are connected to the storage controller 18 for further connection to the host 12. The storage controller 18 is preferably an IBM 3990 Model 3. Host processor 12 is typically a main frame system such as the IBM 3090, ES9000 Model computer, or a comparable system.

The host processor 12 is connected to storage controller 18 through either 4, 8, 12, or 16 system adapters (not shown). There are many types of system adapters: two are parallel and ESCON, although the invention is not limited to these channel types. Parallel system adapters provide attachment to channels via a parallel I/O interface. ESCON system adapters provide channel attachment via the ESCON I/O interface. Each parallel system adapter attaches to one host channel or channel emulator while an ESCON system adapter can attach to multiple host channels.

Each system adapter, in turn, contains a number of control structures which results in the ability to provide up to 128 channels in communication with the storage controller 18 when using ESCON SAs. While it is necessary to understand, generally, that channels connect to the storage controller 18, a discussion of the various channel configurations is beyond the scope of this specification.

Applications 14 within the host 12 may be utilized to access and manipulate data stored within the storage subsystem in a manner well known in the art. Access to desired datasets within the storage subsystem is typically accomplished in the prior art, by setting forth and specifying a unique address or data descriptor for the desired data and transmitting that data descriptor to storage controller 18 via data channel 16.

Read operations in a caching subsystem are now described. When a read request from the host 12 occurs, it is first determined whether the requested data is currently located within the cache 58. If it is, the selected data is transferred directly from the cache 58, through the data channel 16 to the host 12. This situation is known as a "read hit". If the data requested by the channel is not present in the cache 58, a "read miss" occurs and the data must be retrieved from the DASD device. When this happens, the data is concurrently written to cache 58 in anticipation of future requests for that data. In addition, the data present from the requested record to the end of the DASD track is typically copied into cache 58.

Figure 2:
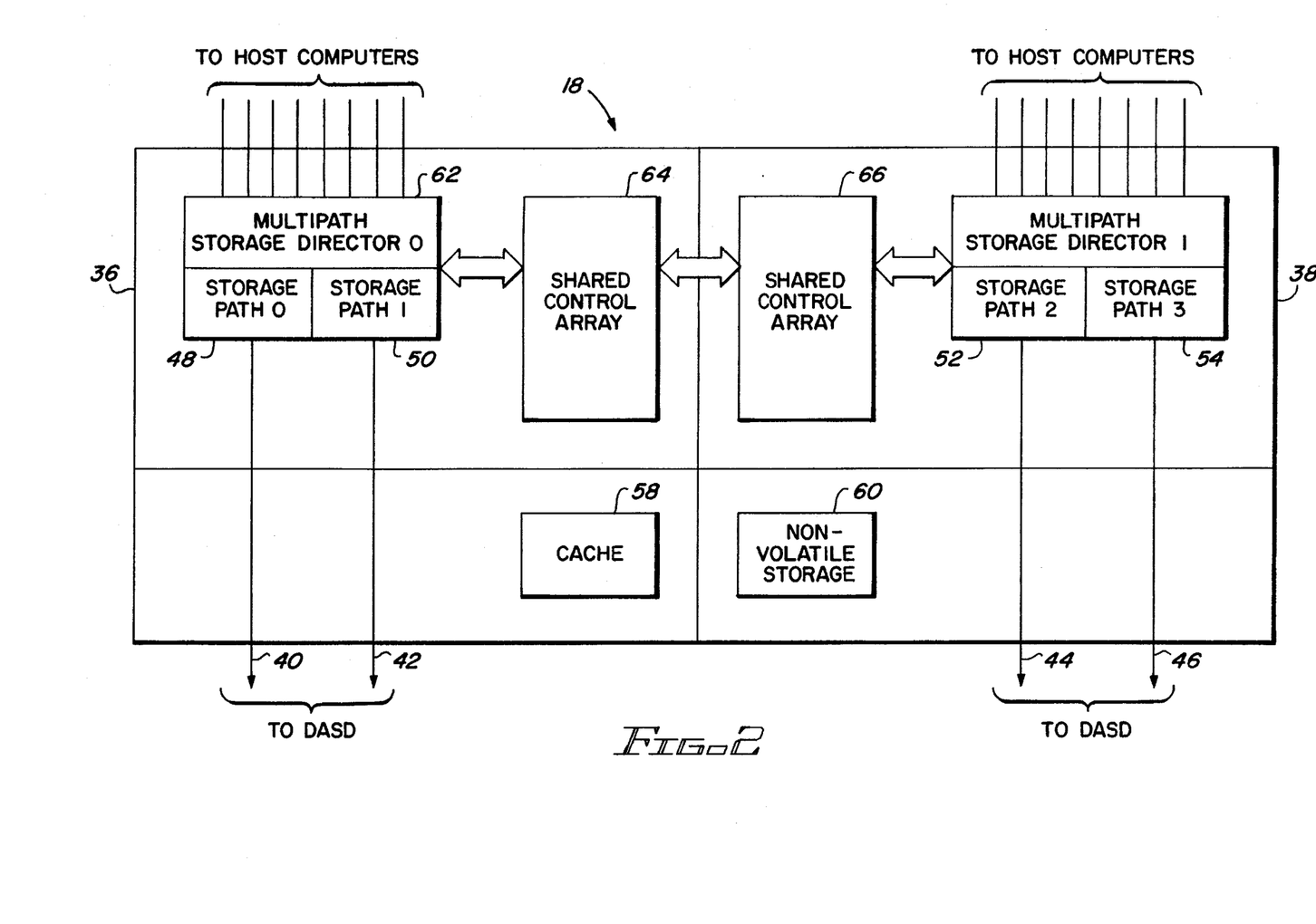
FIG. 2 is a block diagram of a storage controller in the data processing system of the present invention.

Turning to the description of the components in the storage controller 18 depicted in FIG. 2, it can be seen that each cage 36 and 38 is configured with two Storage Paths (SPs) 48, 50, 52 and 54. Each storage path contains a microcontroller capable of interpreting channel commands from the host 12 and controlling the attached DASDs.

Further, each cage contains Shared Control Array (SCA) storage 64 and 66. The SCA stores local status information as well as status information shared with the SCA located in the other cage within the storage controller 18. In this way, unless there is a failure condition present in one or both of the cages, the contents of the two SCAs is identical. Typical shared data includes device status and reconnection data as well as a variety of external registers used by the microcontrollers contained in each of the storage paths 48, 50, 52, and 54. SCA data is accessible to all four storage paths 48, 50, 52, and 54.

Figure 3:
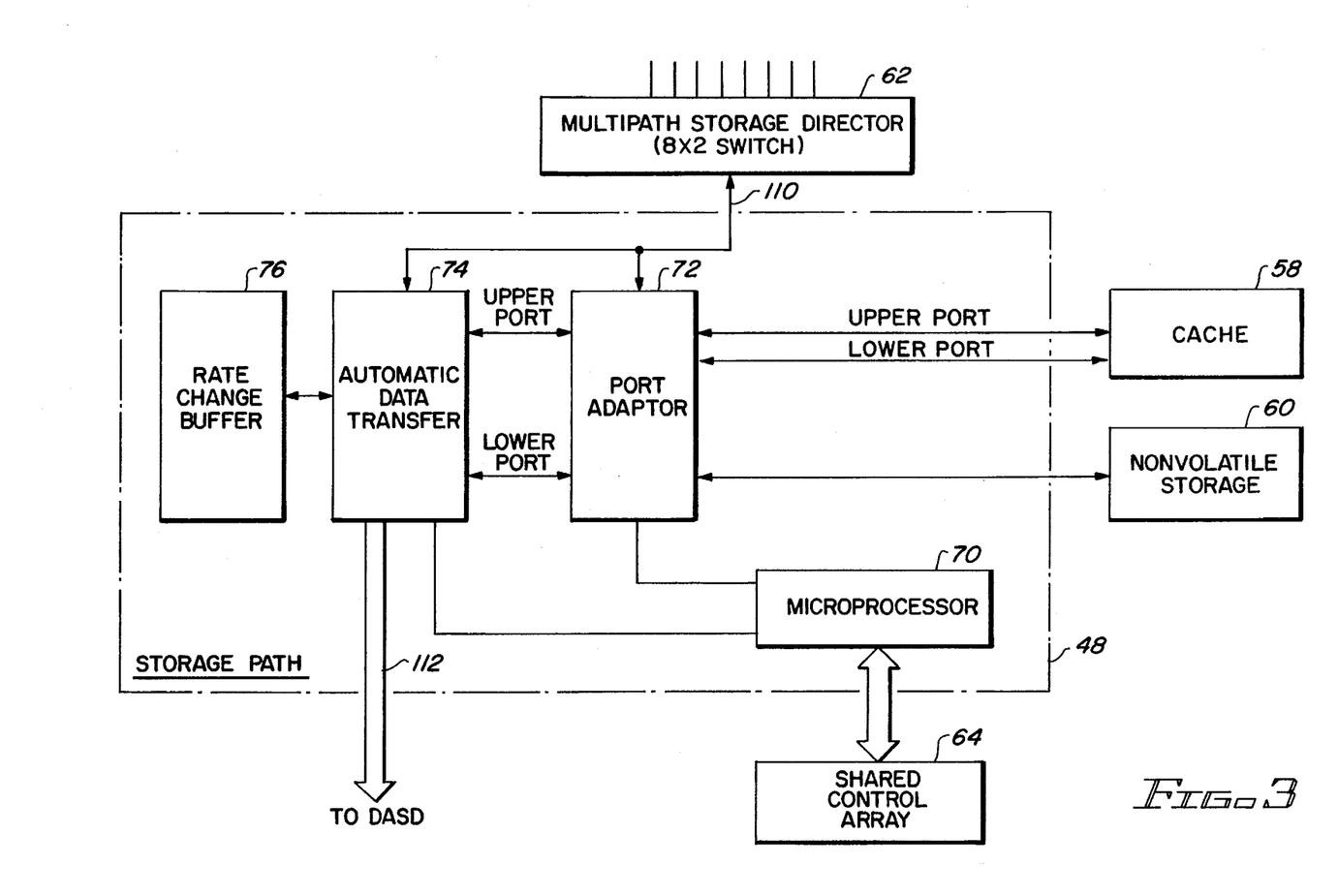
FIG. 3 is a block diagram of a storage path processor contained within the storage controller of the present invention.

FIG. 3 shows one of the four storage paths 48 in the storage controller 18 in a block diagram schematic. All four storage paths being identical, only one will be described herein. Storage path 48 is connected to 8×2 switch 62 by an upper port 110 and to a plurality of DASDs by a lower port 112. Data transfer between the multipath storage director 62 and one of the DASDs during direct DASD operations occurs via an automatic data transfer circuit (ADT) 74 supported by a rate change buffer 76, if required. Rate change buffer 76 compensates for differences between the speed of data transference by DASD and that of channel to host communications. As mentioned above, channel transfers typically occur at a much higher rate than DASD to controller transfers.

The storage path 48 also contains a microcontroller 70 which functions to control all operations taking place on the storage path 48. The microcontroller 70 executes microinstructions which are loaded into a control store (not shown) through an external support facility.

A port adapter (PA) 72 provides control and data paths for the transfer of data between cache 58, nonvolatile storage 60, microcontroller 70 and upper and lower ports 110 and 112.

Cache 58 contains two ports (upper and lower) to allow for two simultaneous data transfers to and/or from the cache element 58. By way of example, data may be transferred from cache 58 and channel 110 while also transferring data to cache 58 from DASD. Data transfer is typically set up by microcontroller 70 and then taken over by the automatic data transfer 74 function without microcontroller intervention until transfer termination.

The particular invention embodied herein will now be described. In a caching storage controller, non-specific read requests may choose any device in their selection process. The device need not be the one which actually contains the data. The above mentioned device selection process is not required with non-specific read requests since for non-specific reads the storage controller 18 implicitly determines the data address as well as the device address based on the data supplied by the host 12 with regard to the non-specific read request.

In addition, the device selection process with non-specific reads is not needed to lock the physical device since for a cached storage controller, multiple concurrent access to data of a particular device is allowed. The storage controller 18 prevents concurrent access to the same physical device by internally obtaining the corresponding physical device lock. The storage controller 18 also prevents concurrent access to a particular data image in cache 58 by locking the corresponding cache data lock.

In a storage subsystem embodying the invention herein, one particular DASD or a set of DASDs may be designated to be selected for all non-specific read requests. This device or set of devices is termed the Utility Volume(s). It is preferable to designate as the Utility Volume the least busy DASD device attached to the storage controller 18. This guarantees that the non-specific read request will rarely, if ever, be rejected on account of a device being busy. This also reduces the probability that the non-specific read request will interfere with another I/O operation.

It is also possible to designate dummy devices as Utility Volumes. A dummy device is a device whose address is recognized by the storage controller 18 for selection purposes even though there is no real physical device associated with this address. A dummy device is a very good candidate for a Utility Volume since, on one hand it is never busy unless servicing a non-specific read request, while on the other hand, the non-specific read requests will not interfere with the execution of regular data requests for real (non-dummy) devices.

Figure 4:
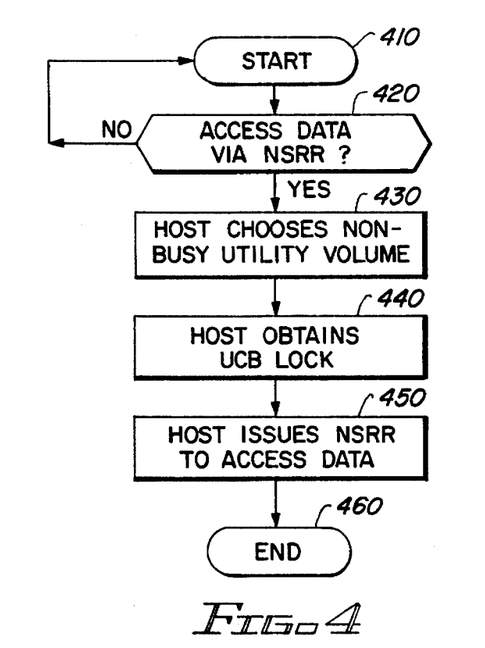
FIG. 4 is a high level logic flowchart illustrating the process by which a host processor services an I/O request.
Figure 5:
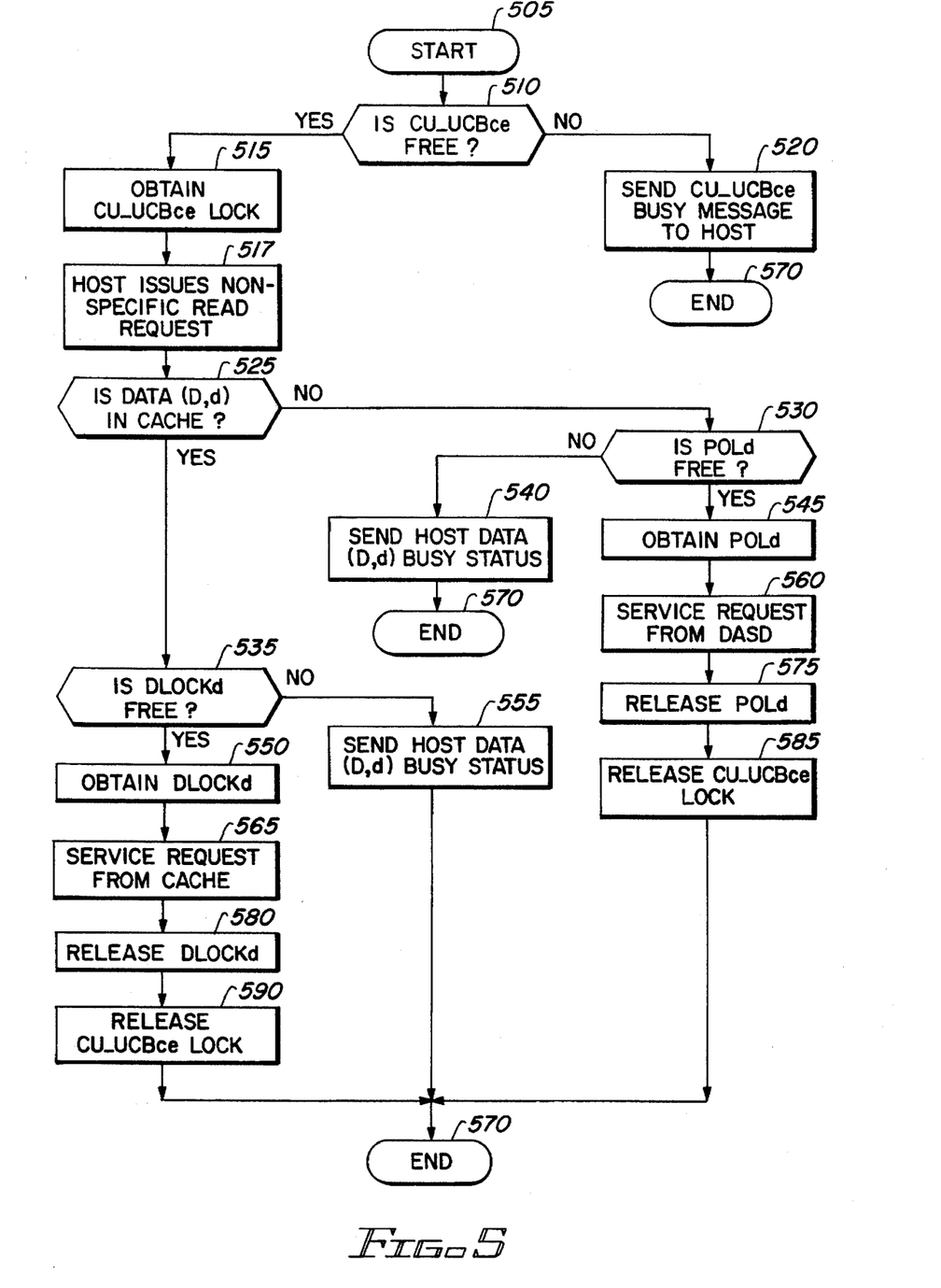
FIG. 5 is a high level logic flowchart illustrating the process by which the storage controller services an I/O request originating from a connected host processor.

The method used to obtain the advantages of servicing non-specific read requests on Utility Volumes is now described in detail and with reference to FIGS. 4 and 5. The following discussion requires, as a preliminary matter, some definitions:

Let Host_UCB$_{CD}$ be the host processor's unique control block for device D controlled by storage controller 18.

Let CU_UCB$_{CD}$ be the storage controller 18's unit control block for device D.

Let PDL$_D$ be the physical device lock for device D.

Let DLOCK$_d$ be the data lock for data item d.

Let DATA(D,d) be the data item to be read by the non-specific read request from location d of device D.

Referring first to FIG. 4, the processing, at the host 12, of a read request for DATA(D,d) is first described. The process begins at step 410. At step 420, it is determined whether the host 12 is requesting data using a non-specific read request. If not, processing continues in a normal fashion (i.e. data is requested using a device address) as is known in the prior art. If the read request is a non-specific read request, then processing continues at step 30. At this step, the host 12 chooses a logically non-busy Utility Volume Host_UCB$_{CE}$ from its set of Host_UCBs that are associated with storage controller 18. For purposes of discussion, this device will be denoted device E. It can be a dummy device or a real device depending on the system configuration.

At step 440, the host 12 obtains a lock for Host_UCB$_{CE}$ in the UCB contained within the requesting host 12. This prevents the requesting host 12 from attempting another I/O operation with the selected device E. It is important to note here, as well as throughout the following discussion, that the two step process of first interrogating a lock and second obtaining the lock, if the lock is free, must be treated and executed as a single atomic operation. It will be clear to one skilled in the art why this is so. Finally, at step 450, the host 12 issues a non-specific read request against Host_UCB$_{CE}$ in order to access Data(D,d). Again, it is at the crux of this invention, and it is important to note that although the data being requested, Data(D,d) is physically located on device D (or in cache 58) the data is requested as if it were located on the Utility Volume, device E.

Turning to FIG. 5, it will now be described how the non-specific read request initiated at the host 12 is serviced at the storage controller 18. The process is initiated at step 505. Following that, at step 510, the storage controller 18 determines if device E is free based upon its own unit control block. If CU_UCB$_{CE}$ is busy then processing continues at step 520. At this step, the storage controller 18 sends a message to the host 12, via the channel, that CU_UCBCE is busy. At this point, processing ends at step 570 and the host 12 must wait for the device to free before it can accomplish the requested non-specific read.

If, on the other hand, CU_UCB$_{CE}$ is free then the storage controller 18 immediately obtains a lock for CU_UCB$_{CE}$ at step 515. The host then requests data via a non-specific read at step 517. Next, at step 525, the storage controller 18 determines whether Data(D,d), which was requested by the host 12, is located within the storage controller cache 58. The following discussion will describe operations if Data(D,d) is in the cache 58. After this discussion, a description of processing in the case where data is not located in the cache 58 will follow. It is important to note that the following descriptions assume that a non-specific read request may be serviced by a DASD physical device. There are instances where an implementation requires that all read requests be serviced only through the cache 58.

When data is found in the storage controller cache 58, it is determined, at step 535, whether the data lock for data item d is free. As described above, in the preferred embodiment of this invention, the storage controller 18 is an IBM 3990 Model 3 which defines a data item located in the cache 58 as one track. If the data lock is busy, the storage controller 18, at step 555 sends the host 12 a message indicating that Data(D,d) is busy. The host 12 can retry later, but until the data lock is released, the host 12 can not access the data irrespective of the fact that the same data may be located on a physical device as well. Processing then terminates at step 570.

If, however, the data lock is free, processing continues at step 550. At this step DLOCK$_d$ is obtained by the storage controller 18. Next, at step 565, the read request is serviced from the cache 58 in a manner the same as with any other read hit. Once the data transfer to the host 12 is completed, DLOCK$_d$ is released in order to allow other I/O operations with the cackle data track. Finally at step 590, the CU_UCB$_{CE}$ lock is released to permit future access to the Utility Volume. Processing then terminates at step 570.

Returning to the decision at step 525, if Data(D,d) is not located in cache 58, the processing flow follows a second path which will now be described. When the data item requested is not located in the cache memory 58 it must be retrieved from the physical DASD device. At step 530, the physical device lock for device D (PDL$_d$) must be interrogated to determined if the data can be read from the device on which it resident. If the device is locked (PDL$_d$ is set) then processing continues at step 540. At this step, the storage controller 18 sends the host 12 a message that Data(D,d) is busy and the host 12 must then wait until the physical device is released before it can read Data(D,d). Processing terminates at step 570.

In the case where PDL$_d$ is free (the DASD may be accessed) processing branches to step 545. At this step the storage controller 18 obtains PDL$_d$ to prevent simultaneous access to this DASD by another entity. Next, at step 560, the read request is serviced from the DASD device and data is sent over the channel to the host processor 12. At step 575, PLD$_d$ is released and at step 585 the CU_UCB$_{CE}$ lock is released. Precessing then terminates at step 570.

It should, be noted that it may sometimes be possible to postpone the execution of a non-specific read request when the necessary locks are not free instead of aborting the operation entirely. This can be accomplished by using a delayed retry status instead of simply rejecting the request with a busy status. The delayed retry status operation is described in *Extended Count Key Data Architecture Definition*, IBM Manual G066-18, published by the IBM Corporation in 1991. Reference to this publication is made with regard to the delayed retry status operation.

The invention herein provides among its advantages the ability to concurrently process data transfer operations. For example, when a non-specific read request is being serviced through the cache, other (specific or non-specific) data requests may be executed in parallel even though both transfer operations are accessing the same physical device or data image of the same physical device. As another example, when a non-specific read request is being serviced from a DASD device, other data requests accessing the cache data image of the same physical device as the device accessed by the non-specific read request may be processed in parallel.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system having at least one host system, a storage controller attached to said host system, and a plurality of data storage devices connected to said storage controller, said host system maintaining a host unit control block for each said data storage device of said plurality of data storage devices and said storage controller maintaining a controller unit control block for each of said data storage devices, a method for servicing a non-specific read request for a data record from said host system comprising the steps of:

generating the non-specific read request at said host system for said data record, wherein said data record resides on a first data storage device of said plurality of data storage devices having a first host unit control block corresponding therewith;

selecting a second host unit control block wherein said second host unit control block corresponds to a second data storage device of said plurality of data storage devices, said second data storage device different than said first data storage device;

locking said second host unit control block;

transmitting said non-specific read request to said storage controller, said non-specific read request including said second host unit control block; and accessing the data record according to said non-specific read request.

2. The method of servicing the non-specific read request as recited in claim 1 wherein said storage controller further includes a cache memory, said cache memory having a data lock for each data item contained within the cache memory, said method further comprising the steps of:

locating a first controller unit control block that corresponds to said second host unit control block and to said second data storage device;

determining whether said second data storage device is in a non-busy state;

in response to a determination that said second data storage device is in a non-busy state, locking said first controller unit control block;

determining whether said data item containing said data record is located within said cache memory;

in response to a determination that said data item is in cache memory, determining whether said data lock corresponding to said data item is unlocked;

in response to a determination that said data lock corresponding to said data item is unlocked, locking said data lock corresponding to said data item;

in the case where said first controller unit control block is in a non-busy state, said data item is in cache memory, and said data lock corresponding to said data item is unlocked, transferring said data record from said storage controller to said host system;

next, releasing said data lock corresponding to said data item; and releasing said first controller unit control block.

3. The method of claim 2 wherein said step of determining whether said first data storage device is in a non-busy state and the step of locking said first controller unit control block are accomplished as a single atomic operation.

4. The method of claim 2 wherein said step of determining whether said data lock corresponding to said data item is unlocked and the step of locking said data lock corresponding to said data item are accomplished as a single atomic operation.

5. The method of claim 2 wherein said data item is a track of data.

6. The method of servicing the non-specific read request as recited in claim 1 wherein said storage controller further maintains a physical device lock corresponding to each data storage device, said method further comprising the steps of:

locating a first controller unit control block corresponding to said second host unit control block;

determining whether said second data storage device is in a non-busy state;

in response to a determination that said second data storage device is in a non-busy state, locking said first controller unit control block;

determining whether said physical device lock corresponding to said first data storage device containing said data record is unlocked;

in response to a determination that said physical device lock corresponding to said first data storage device containing said data record is free, locking said physical device lock;

in the case where said first data storage device is in a non-busy state and said physical device lock corresponding to said first data storage device containing said data record is unlocked, transferring said data record from said first data storage device to said host system;

next, releasing said physical device lock corresponding to said first data storage device containing said data record; and releasing said first controller unit control block.

7. The method of claim 6 wherein said step of determining whether said first data storage device is in a non-busy state and the step of locking said first controller unit control block are accomplished as a single atomic operation.

8. The method of claim 6 wherein said step of determining whether said physical device lock corresponding to said first data storage device containing said data record is unlocked and the step of locking said physical device lock are accomplished as a single atomic operation.

9. A method of servicing a non-specific read request for a data record generated at a host processor and transmitted to a storage controller, said non-specific read request including a selected non-busy host unit control block for requesting said data record stored on a first data storage device of a plurality of data storage devices, said storage controller connected to said plurality of data storage devices, said storage controller including a cache memory, said cache memory having a data lock corresponding to a data item contained within said cache memory, said storage controller further maintaining a physical device lock corresponding to each data storage device, said method comprising the steps of:

locating a controller unit control block corresponding to said non-busy host unit control block, wherein said non-busy host unit control block further corresponds to a second data storage device;

determining whether said second data storage device in a non-busy state;

in response to a determination that said second data storage device is in a non-busy state, locking said controller unit control block corresponding to said second data storage device;

determining whether said data item containing said data record is located within said cache memory;

in response to a determination that said data item is in said cache memory, determining whether said data lock corresponding to said data item is unlocked and if so, transferring said data record from said cache to said host system;

in response to a determination that said data item is not in said cache memory determining whether said physical device lock corresponding to said first data storage device containing said data record is unlocked and if so, transferring said data record from said first data storage device to said host system; and next, releasing said controller unit control block corresponding to said second data storage device.

10. The method of claim 9 wherein when it is determined that said data lock corresponding to said data item is locked or it is determined that said physical device lock corresponding to said first data storage device containing said data record is locked, postponing the execution of said non-specific read request until such time as said data lock is unlocked or said physical device lock is unlocked.

11. The method of claim 9 further including the step of executing a specific read request in parallel with said non-specific read request when said data record is located in said cache memory, said specific read request accessing said first data storage device, said specific read request retrieving a next data record stored on said first data storage device.

12. The method of claim 9 further including the step of executing a specific read request in parallel with said non-specific read request accessing the same cache memory as that of said non-specific read request.

13. A data processing system comprising:

at least one host computer, said at least one host computer maintaining a plurality of host unit control blocks;

a storage subsystem including a plurality of direct access storage devices including a first direct access storage device storing a first data record thereon and including a second direct access storage device, and a storage controller, said storage controller being connected to each of the plurality of direct access storage devices and to said at least one host computer;

a physical device lock corresponding to each direct access storage device of said plurality of direct access storage devices maintained within said storage controller;

means for generating a non-specific read request at said at least one host computer for said first data record;

means for selecting one of said host unit control blocks corresponding to said second direct access storage device in a non-busy state;

means for locking said selected host unit control block corresponding to said second direct access storage device; and means for transmitting said non-specific read request to said storage controller for sending said data record to said at least one host computer.

14. The data processing system as set forth in claim 13, further comprising:

a cache memory within said storage controller, said cache memory having a data lock corresponding to a subset of data items contained within said cache memory;

means for locating a controller unit control block corresponding to one of said host unit control blocks corresponding to said second direct access storage device;

means for determining whether said second direct access storage device is in a non-busy state;

means responsive to a determination that said second direct access storage device is in a non-busy state, for locking said corresponding controller unit control block;

means for determining whether said data record is located within said cache memory;

means responsive to a determination that said data record is in cache memory, for determining whether said data lock corresponding to said data record is unlocked;

means responsive to a determination that said data lock corresponding to said data record is unlocked, for locking said data lock corresponding to said data record;

means responsive to determinations that said controller unit control block is in a non-busy state, said data record is in cache memory and said data lock corresponding to said data record is unlocked, for transferring said data record from said storage controller to said host computer;

means for releasing said data lock corresponding to said data record; and means for releasing said controller unit control block.

15. The data processing system as set forth in claim 13, further comprising:

means for locating a controller unit control block corresponding to said second direct access storage device;

means for determining whether said second direct access storage device is in a non-busy state;

means responsive to a determination that said second direct access storage device is in a non-busy state, for locking a corresponding physical device lock of said controller unit control block;

means for determining whether said physical device lock corresponding to said first direct access storage device containing said data record is unlocked;

means responsive to a determination that said physical device lock corresponding to said first direct access storage device containing said data record is unlocked, for locking said physical device lock corresponding to said first direct access storage device;

means responsive to determinations that said first direct access storage device is in a non-busy state and said physical device lock corresponding to said first direct access storage device containing said data record is unlocked, for transferring said data record from said first direct access storage device to said host computer;

means for releasing said physical device lock corresponding to said first direct access storage device containing said data record; and means for releasing said controller unit control block.

* * * * *